US007103616B1

(12) United States Patent
Harmer et al.

(10) Patent No.: US 7,103,616 B1
(45) Date of Patent: Sep. 5, 2006

(54) COOKIE-BASED DIRECTORY NAME LOOKUP CACHE FOR A CLUSTER FILE SYSTEM

(75) Inventors: Craig K. Harmer, San Francisco, CA (US); Ravideep Singhvi, Pune (IN); Shekhar Deshkar, Pune (IN)

(73) Assignee: VERITAS Operating Corporation, Mountain View, CA (US)

( * ) Notice: Subject to any disclaimer, the term of this patent is extended or adjusted under 35 U.S.C. 154(b) by 511 days.

(21) Appl. No.: 10/369,968

(22) Filed: Feb. 19, 2003

(51) Int. Cl.
*G06F 17/30* (2006.01)
(52) U.S. Cl. .................................... 707/201
(58) Field of Classification Search ............. 707/1–10, 707/100–104.1, 200–205
See application file for complete search history.

(56) References Cited

U.S. PATENT DOCUMENTS

| | | | |
|---|---|---|---|
| 5,940,841 A * | 8/1999 | Schmuck et al. | 707/205 |
| 5,950,205 A * | 9/1999 | Aviani, Jr. | 707/103 R |
| 6,850,252 B1 * | 2/2005 | Hoffberg | 715/716 |
| 6,915,307 B1 * | 7/2005 | Mattis et al. | 707/103 R |
| 6,928,466 B1 * | 8/2005 | Bulka et al. | 709/213 |
| 6,950,833 B1 * | 9/2005 | Costello et al. | 707/201 |
| 2004/0117486 A1 * | 6/2004 | Bourne et al. | 709/228 |
| 2005/0015354 A1 * | 1/2005 | Grubbs et al. | 707/1 |

OTHER PUBLICATIONS

Ramesh Balan et al., "Cluster File System with RDMA," Veritas Software Corporation, Sep. 9-12, 2002, (35 pages).
"Disk I/O Troubleshooting," http://www.princeton.edu/~unix/Solaris/troubleshoot/diskio.html, Sep. 22, 2000, (7 pages).
Sun Performance—Increase System Performance by Maximizing Your Cache, http://www.sun.com/sun-on-net/itworld/UIR970201perf.html, Feb. 1, 1997, (6 pages).
"Chapter 28 Improving System Performance with DNLC," http://docs.sun.com/db/doc/806-7502/6jgce01uu?a=view, Jun. 2000, (3 pages).
Hal Stern, "A file by any other name," http://sunsite.uakom.sk/sunworldonline/swol-09-1995/swol-09-sysadmin.html, Sep. 1995, (9 pages).
"Finding and removing bottlenecks," Christenson-Textures, Chapter 7, Aug. 22, 2002, (pp. 165-192).
"Clustering for Availability," Veritas Software Corporation, 2002, (4 pages).
"VERITAS SANPoint Foundation Suite," Veritas Software Corporation, Sep. 2001, (24 pages).
"Sun Cluster 3.0 Software Cluster File System (CFS): Making the Most of the Global File Services," Sun Microsystems, 2001, (31 pages).

* cited by examiner

*Primary Examiner*—Mohammad Ali
*Assistant Examiner*—Navneet K Ahluwalia
(74) *Attorney, Agent, or Firm*—Robert C. Kowert; Meyertons, Hood, Kivlin, Kowert & Goetzel, P.C.

(57) ABSTRACT

A method may involve: a node included in a cluster looking up a file in a metadata name cache; in response to a miss for the file in the metadata name cache, the node creating a metadata name cache entry for the file in the metadata name cache, where the metadata name cache entry includes a copy of a cookie associated with metadata allocated to the file; in response to a lock on the metadata changing state for the node, the node modifying the cookie associated with the metadata, where the lock changes state for the node in response to a request to a global lock manager for the lock on the metadata; and comparing the copy of the cookie stored in the metadata name cache entry to a current value of the cookie associated with the metadata to determine if the metadata name cache entry is valid.

20 Claims, 4 Drawing Sheets

| Activity | N1 | N2 | N3 |
|---|---|---|---|
| 1 Initial State | No File | No File | No File |
| 2 Create F1 on N1 | Acquire EX lock<br>Assign IP11 cookie value C11<br>Store C11 in F1 DNLC entry | No inode/entry | No inode/entry |
| 3 Lookup F1 on N2 | EX lock revoked to SH<br>IP11 cookie value C11 | Acquire SH lock<br>Receive IP21 cookie C11<br>Store C11 in F1 DNLC entry | No inode/entry |
| 4 Lookup F1 on N3 | SH lock<br>IP11 cookie value C11 | SH lock<br>IP21 cookie value C11 | Acquire SH lock<br>Receive IP31 cookie C11<br>Store C11 in F1 DNLC entry |
| 5 Acuire EX on N2 | SH lock revoked to No lock<br>IP11 cookie value INV | Acquire EX lock<br>IP21 cookie value C11 | SH lock revoked to No lock<br>IP31 cookie value INV |
| 6 Lookup F1 on N3 | No lock<br>IP11 cookie value INV | EX lock revoked to SH<br>IP21 cookie value C11 | Acquire SH lock<br>Receive IP31 cookie C11 |
| 7 Remove F1 on N3 | No lock<br>IP11 cookie value INV | SH lock revoked to No Lock<br>IP21 cookie value INV | Acquire EX lock<br>Assign IP31 cookie value C31 |
| 8 Lookup F1 on N1 | Acquire SH lock<br>Receive IP11 cookie C31<br>Invalidate F1 DNLC entry | No lock<br>IP21 cookie value INV | EX lock revoked to SH<br>IP31 cookie value C31 |
| 9 Reallocate IN31 to F2 on N3 | SH lock revoked to No lock<br>IP11 cookie value INV | No lock<br>IP21 cookie value INV | Acquire EX lock<br>Assign IP31 cookie value C32<br>Store C32 in F2 DNLC entry |
| 10 Lookup F2 on N2 | No lock<br>IP11 cookie value INV | Acquire SH lock<br>Receive IP21 cookie value C32<br>Store C32 in F2 DNLC entry | EX lock revoked to SH<br>IP31 cookie value C32 |

FIG. 3

COOKIE-BASED DIRECTORY NAME LOOKUP CACHE FOR A CLUSTER FILE SYSTEM

BACKGROUND

1. Field of the Invention

This invention relates to computer systems and, more particularly, to directory name lookup caches within a clustered file system.

2. Description of the Related Art

File systems organize and manage information stored in a computer system. Typically, information is stored in the form of files. File systems may support the organization of user data by providing and tracking organizational structures such as folders or directories. The file system may interpret and access information physically stored in a variety of storage media, abstracting complexities associated with the tasks of locating, retrieving, and writing data to the storage media.

Files are typically located by specifying a path to that file. The path may indicate which directories or folders include that particular file. A typical path is a sequence of directory or folder names, starting at the file system's root directory, and ending with the name of the file or directory being identified.

In some operating environments such as UNIX, information about each file in the file system is kept in a metadata structure called an inode. The inode contains metadata, which includes a pointer to the physical blocks containing the data in the file and information indicating the type of file, the permission bits, the owner and group, the file size, and the file modification date and time. Terms such as file nodes, file table entries, and snodes are also used to identify similar metadata structures. For example, the term "master file table entry" is used in some Windows™ based file systems.

File systems often include a special cache, typically called a DNLC (Directory Name Lookup Cache), to store pathname to inode translations. Without a DNLC, all pathname to inode translations involve scanning each directory in the path to get the inode identifiers for the targeted file and each of that file's parent directories. Since the directories are located on disk, these accesses can take a significant amount of time. A DNLC caches inode information for recently accessed files so that at least some of these disk accesses can be avoided.

As with other caches, problems with cache coherency can arise when multiple components in a system can act in ways that affect the validity of information in other components' DNLCs. For example, in a clustered system that includes multiple computing nodes, each node may be able to manipulate files in a particular file system. If one node has cached information for a particular file in its DNLC and another node renders that information invalid (e.g., by removing the file), the node with the cached information needs to be notified that its information for that particular file is no longer reliable. However, providing such notification may consume an undesirable amount of system resources.

SUMMARY

Various embodiments of systems and methods for implementing cookie-based DNLCs in a cluster are disclosed. In one embodiment, a method may involve: a node included in a cluster looking up a file in a metadata name cache; in response to a miss for the file in the metadata name cache, the node creating a metadata name cache entry for the file in the metadata name cache, where the metadata name cache entry includes a copy of a cookie associated with metadata allocated to the file; in response to a lock on the metadata changing state for the node, the node modifying the cookie associated with the metadata, where the lock changes state for the node in response to a request to a global lock manager for the lock on the metadata; and comparing the copy of the cookie stored in the metadata name cache entry to a current value of the cookie associated with the metadata to determine if the metadata name cache entry is valid.

In some embodiments, a node in a cluster may include a processor and a memory storing program instructions executable by the processor to implement a file system configured to: allocate an entry in a metadata name cache to store a pointer to metadata associated with a file; store a copy of a cookie value associated with the metadata in the entry upon allocation of the entry; update the cookie value associated with the metadata in response to a lock on the metadata changing state for the node, where the lock changes state for the node in response to a request to a global lock manager for the lock on the metadata; and compare the copy of the cookie value stored in the entry with the cookie value associated with the metadata to determine if the entry is valid.

Another embodiment of a method may involve: a node included in a cluster looking up a file in a metadata name cache; in response to a miss for the file in the metadata name cache, the node creating a metadata name cache entry for the file in the metadata name cache, where the metadata name cache entry includes a copy of a cookie associated with metadata allocated to the file; in response to another node in the cluster reusing the metadata or renaming or removing the file, the other node in the cluster modifying a value of the cookie associated with the metadata; a lock manager providing the modified value of the cookie to the node in response to that node requesting a lock on the metadata; the node comparing the copy of the cookie stored in the metadata name cache entry to the modified value of the cookie associated with the metadata in order to identify whether the metadata name cache entry is valid.

Embodiments of a clustered computer system may include several nodes and a communications interconnect coupling the nodes. Each of the nodes includes a DNLC (Directory Name Lookup Cache) that includes several entries. Each entry includes a pointer to an inode associated with the file with which that entry is associated and a copy of a cookie value associated with the inode. Each of the nodes is configured to validate an entry in that node's respective DNLC by comparing the copy of the cookie value stored in the entry to the cookie value associated with the inode pointed to in the entry.

In one embodiment, a computer readable medium may store program instructions computer executable to: look up a metadata identifier associated with a file in a metadata name cache included within a node in a cluster; allocate an entry for the file in the metadata name cache in response to a miss for the file in the metadata name cache, where the entry includes a copy of a cookie associated with metadata associated with the file; modify the cookie associated with the metadata in response to a lock on the metadata changing state for the node, where the lock changes state for the node in response to a request to a global lock manager for a lock on the metadata; and compare the copy of the cookie stored in the entry to the cookie associated with the metadata to determine if the entry is valid.

BRIEF DESCRIPTION OF THE DRAWINGS

A better understanding of the present invention can be obtained when the following detailed description is considered in conjunction with the following drawings, in which:

FIG. 3 illustrates exemplary cookie values that may be generated when implementing a cookie-based DNLC, according to one embodiment.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
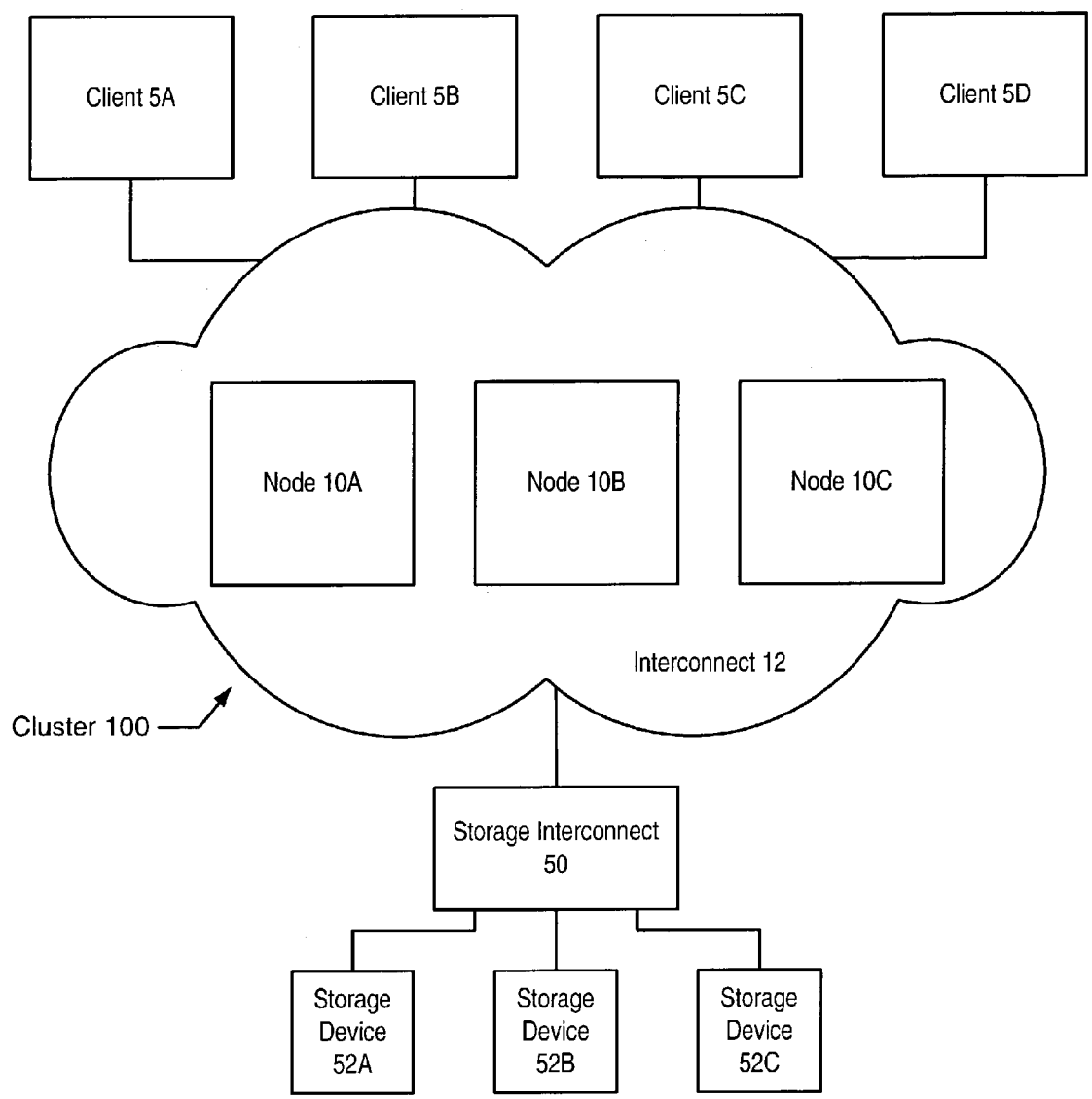
FIG. 1 illustrates a clustered computer system, according to one embodiment.

FIG. 1 shows a block diagram of a clustered computing system, according to one embodiment. Client devices 5A–5D (collectively, clients 5) are coupled to communicate with cluster 100. Clients 5 may be connected to cluster 100 via a network such as a local area network (LAN) or a wide area network (WAN) such as the Internet. Cluster 100 includes nodes 10A–10C that are coupled by an interconnect 12. As used herein, a "node" may be a stand-alone computer, server, or other computing device, as well as a virtual machine, thread, process, or combination of such elements. Nodes 10 may process requests from clients 5. Interconnect 12 may include various communication links (e.g., electrical, fiber optic, and/or wireless links) that couple nodes 10. Nodes 10 may be configured to provide high availability, fail-over, load-balancing, and/or scalability (e.g., by supporting the dynamic addition and/or removal of nodes) within cluster 100. Interconnect 12 may include a LAN or WAN or a combination of networks. Nodes 10 in cluster 100 may access data stored by storage devices 52A–52C via storage interconnect 50 when responding to requests from clients 5. Storage interconnect 50 may be part of the same network(s) as interconnect 12, or may be a separate storage area network (SAN) including one or more Fibre Channel hubs or switches, for example.

Nodes 10 may use a cluster file system to manage data stored by storage devices 52. Each node 10 may mount and use the cluster file system at the same time. The cluster file system may manage access to the file system data in the same way as if all applications were accessing a single file system server. Thus, cluster 100 may appear as a single entity to clients 5.

Storage devices 52 may each include a mass storage device such as a hard disk, flash memory, MEMs (Micro Electro Mechanical systems), magnetic drums, magneto-optical storage, CD-ROM (Compact Disc Read Only Memory), or DVD (Digital Versatile Disc) ROM. Storage devices 52 may also include a combination of such devices. In some embodiments, storage devices 52 may include one or more arrays of such storage devices. For example, storage devices 52 may include a RAID (Redundant Array of Independent Disks) subsystem or a JBOD (Just a Bunch Of Disks) enclosure. Storage devices 52 may be object-based storage devices (OBSDs) or support hash-addressable storage (devices in which a block of data is identified by a unique hash of the contents of the block) in some embodiments. In some embodiments, storage devices 52 may be coupled to cluster 100 by a SAN (Storage Area Network). In other embodiments, storage devices 52 may be network attached storage (NAS) devices, Note that the embodiment illustrated in FIG. 1 is merely exemplary, and that many variations are possible. For example, other embodiments may support different numbers of clients 5 or include different numbers and/or types of nodes 10, storage devices 52, and/or storage interconnects 50.

Figure 2:
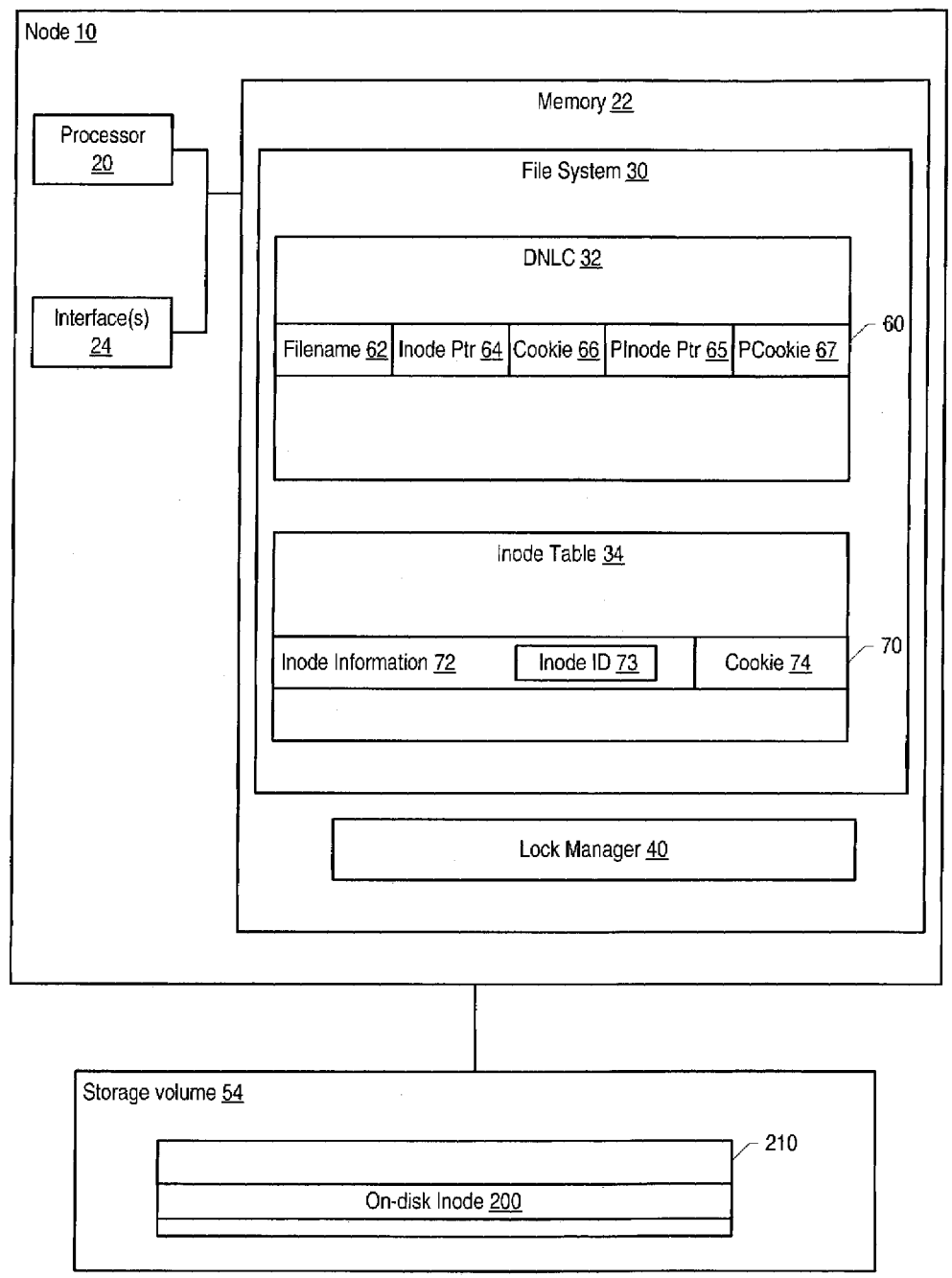
FIG. 2 illustrates a node within a clustered computer system, according to one embodiment.

FIG. 2 illustrates a node 10 coupled to a storage volume 54. The storage volume 54 may be implemented on one or more storage devices 52 and coupled to the node 10 via a storage interconnect 50. A node may include one or more processors 20, one or more interfaces 24 for coupling the node to the interconnect 12 and/or storage interconnect 50, and a memory 22. Memory 22 may store instructions and data implementing a distributed lock manager 40 and a cluster file system 30 that includes a DNLC 32 and an inode table 34. The distributed lock manager 40 and cluster file system 30 may be distributed among the other nodes 10 in the cluster (e.g., each node 10 may store and execute instructions implementing at least a portion of the functionality of file system 30). An instance of the cluster file system may maintain a DNLC 32 and inode table 34 on each node of the cluster.

In one embodiment, the cluster file system 30 may manage write behavior among the nodes 10 so that file system writes appear to be consistent. For example, if an application writes data to a file, any subsequent application reads to the same file area may retrieve the new data, even if that data has been cached by the file system 30 and not yet written to disk. The cluster file system 30 may prevent applications from retrieving "stale" data, or partial results from a prior write. The cluster 100 may also include a distributed lock manager 40 (also referred to as a global lock manager) to provide this atomicity. In one embodiment, the distributed lock manager 40 may be configured to select a master node for each lock. When a node requests that lock, the distributed lock manager 40 may forward the request to the appropriate master lock, which will in turn grant the lock and revoke any previously held locks.

In some embodiments, global locks with three states may be supported: exclusive (meaning only one node holds the lock), shared (meaning more than one node may hold the lock), and invalid (a node holding an invalid lock cannot access the targeted inode until a lock in the appropriate state has been acquired). A node holding a lock in a particular state (e.g., in the exclusive state) is described herein as holding a particular type of lock (e.g., an exclusive lock). A shared lock may provide a node with the right to read an associated inode. Exclusive locks allow nodes to perform actions such as removing or renaming files, and reallocating inodes. When a node holds an exclusive lock on an inode and another node requests a shared lock on that inode, the exclusive lock is revoked to a shared lock. When a node holds a shared or exclusive lock on an inode and another node requests an exclusive lock, the node's shared or exclusive lock is revoked to invalid. Note that other embodiments may implement different and/or additional global locks, e.g., global locks having additional states, global locks having different state interactions, and/or global locks having different semantics.

Inode list 210 in storage volume 54 may include entries for a plurality of on-disk inodes 200 (note that the term "on-disk inodes" may refer to inodes stored on storage devices other than disk drives). Inode list 210 stores metadata associated with each file in a metadata structure referred to as an inode. When a file is created, the file system 30 allocates an on-disk inode 200 to that file. The metadata in each on-disk inode 200 allows file system 30 to locate the file data associated with that inode within storage devices 52. Exemplary types of files that may be managed by file system 20 include regular files (e.g., text or binary data files), directory files (files which include other files and/or directories), executable files, symbolic links (files which point to other files), device special files (files which provide an interface to hardware), sockets (files which provide an interface to a network program), and named pipes (files which provide access to other programs). Note that as used herein, the term "inode" describes any structure that stores file metadata identifying the location of the file's data within a storage device. For example, a location may be identified by a block number in a block-addressable storage device, the object name of one or more storage objects in an OBSD, or a unique hash of the contents of a block of storage in a hash-addressable storage device. Other names often used to describe metadata structures 200 include file nodes, master file table entries, and snodes. In some types of file systems, an inode list 210 is referred to as a master file table. Inodes are uniquely identified by an inode identifier such as an inode number or file reference number.

Inode table 34 in memory 22 is an example of a means for caching on-disk inodes or similar metadata. Inodes cached within an inode table 34 in a node 10 may be referred to as in-core inodes. Each inode 70 within inode table 34 is identified by an inode pointer. As used herein, an inode pointer is any information that identifies an inode in an inode table 34. Each inode 70 is identified by an inode pointer (e.g., locating that inode 70 at a particular numerical position within the inode table 34). Note that each node 10 may use a different inode pointer to refer to the same inode. For example, copies of the same on-disk inode may be stored in different locations in each node's local inode table 34. Accordingly, each node 10 may identify that an in-core copy 70 of the same inode 200 using a different local inode pointer. However, the on-disk copy 200 of that inode 70 may be identified using the same on-disk inode identifier 73 from all nodes 10.

As shown in FIG. 2, an inode 70 may include various inode information 72 (e.g., information indicating the physical location of its associated file data and/or other metadata indicating permissions, file type, owner and/or group information, file size, and/or file modification date and time for the associated file) and a cookie 74 associated with that inode 70. The inode information may include a unique inode identifier 73 that identifies the on-disk copy of the inode. As used herein, a cookie includes values, such as numbers and/or strings, that can be compared to values in other cookies.

Each node 10 may use a DNLC (Directory Name Lookup Cache) 32 to cache the inode identifiers associated with recently accessed filenames. The first time a particular filename is accessed by a node 10, that filename will miss in the node's DNLC 32. The file system may access one or more files in the storage volume 54 in order to retrieve the inode identifier 73 of the inode associated with the requested filename. As each inode identifier associated with one of the files specified in the file's pathname is retrieved from disk, the file system 30 may allocate an in-core inode table entry to the inode and allocate an entry in the DNLC 32 to store a inode pointer to the in-core inode and the associated filename so that the information can be retrieved without having to access disk storage or other metadata the next time that filename is referenced. Each DNLC 32 entry may also store the inode pointer to an in-core inode associated with the file's parent directory so that DNLC lookups may be performed based on filenames and parent directory inode pointers.

Each pathname component of a particular pathname may be cached individually in the DNLC 32. For example, when looking up a file named "purple" having a pathname/public/docs/purple, the DNLC 32 may have entries for one or more of the files "public", "docs", and "purple". Note that the contents of one node's DNLC 32 may be independent of all other nodes' DNLC contents.

Each DNLC entry 60 may include filename information (e.g., a hash or copy of all or part of a file's filename) 62, an inode pointer 64 to the in-core inode 70 associated with the filename, and a cookie value 66 associated with the in-core inode 70. Each time a new entry 60 is allocated in DNLC 32, the file system 30 may store the value of a cookie 66 in that entry. The cookie value 66 is the current value of a cookie 74 associated with the inode 70 whose pointer is being stored in that entry 60. If the node 10 maintains a local inode table 34, the cookie value 66 may be the current value of the cookie 74 stored with the inode 70 in inode table 34. The cookie value 66 stored in a DNLC 32 entry provides a snapshot of the value of the inode cookie stored in inode table 34 at the time that DNLC 32 entry is created. In some embodiments, each DNLC entry 60 may store a filename 62, a parent directory inode pointer (Pinode Ptr) 65, a parent directory inode cookie (PCookie) 67, a inode pointer 64 to the inode 70 associated with the filename, and an inode cookie 66, as shown in FIG. 2. In such embodiments, lookups into the DNLC 32 may determine that an entry 60 matches if the entry's filename 62, parent directory inode ID 65, and parent directory inode cookie 67 equal values input to the DNLC 32. The parent directory inode cookie value 67 may be stored in the DNLC entry 60 at the time that entry is allocated by storing the current value of the parent directory's inode cookie from inode table 34.

In a clustered system, one node may perform actions that affect the validity of information cached in another node's DNLC 32. For example, one node may remove or rename a file to which another node has allocated a DNLC entry. To avoid consistency problems that may result from activities such as these, each node's DNLC 32 may be cookie-based such that the validity of each DNLC entry is determined by the cookie value 66 stored in that entry. Each time a DNLC entry 60 is accessed, the file system 30 may test the validity of that entry's cookie 66 by comparing the cookie 66 to the cookie 74 stored with the associated inode 70. If the two values are equal, the DNLC entry cookie 66 may be considered valid. If the two values do not match, the file system may invalidate the DNLC entry 60 and/or access other metadata (e.g., by performing a directory scan) to retrieve the inode identifier 73 associated with the requested file and create a new DNLC entry. Any updates that affect the validity of a DNLC entry 60 may cause the value of the cookie 74 associated with the inode 70 identified in DNLC entry 60 to be modified, effectively invalidating the DNLC entry 60.

Generally, one or more cookie generation routines are included in cluster 100. A lock may protect access to the cookie generation routine(s) so that each cookie value is only provided to a requesting routine a single time. Such a routine may include a counter used to provide all or part of each cookie value. The counter may be incremented each time that cookie generation routine generates a new cookie or receives a new request for a cookie. A cookie-generating routine may be called each time a local inode 70 is reused or the file associated with an on-disk inode 200 is renamed or removed. In some embodiments, a directory's inode cookie may also be updated whenever the permissions on that directory are changed. If each DNLC entry 60 stores a parent directory inode cookie 67, updating the directory's inode cookie may effectively invalidate the DNLC entries for any files within that directory since the parent directory inode cookie value 67 in each of the files' DNLC entries will no longer match the value of the parent directory inode cookie in inode table 34. This may prevent lookups for any of the files within that directory from hitting in the DNLC 32.

Cookies may be generated to be globally unique in a cluster (i.e., each cookie value may be unique within the cluster). In one embodiment, global uniqueness of cookie values may be provided by having one node 10 be responsible for all cookie generation within the cluster 100. In other embodiments, each node 10 may perform cookie generation. To ensure uniqueness, each node may be assigned a unique range of cookies or, alternatively, each node may include a unique node ID in all cookies generated by that node.

In some embodiments in which nodes 10 generate cookies locally, each thread executing on that node may requests cookies from a cookie-generation thread. In some embodiments, contention among threads may be reduced by having each thread generate cookies independently. Cookies generated by each thread may include a thread ID that is unique to that thread in order to ensure uniqueness among cookies generated by different threads.

Nodes that fail and subsequently rejoin the cluster 100 may introduce errors if the cookie values generated by the failed node after rejoining the cluster are indistinguishable from the cookie values generated by the failed node before failure. In some embodiments, these errors may be avoided by invalidating all DNLC entries in all nodes that contain cookie values generated by the failed node when the failed node leaves or rejoins the cluster. If each node generates cookie values that contain a unique node ID, this invalidation may be performed by searching each DNLC 32 for cookie values containing the node ID of the failed node and invalidating any matching entries. In other embodiments, errors due to failed nodes rejoining the cluster 100 may be avoided by including a cluster generation ID in each cookie value generated by a node. For example, when the cluster 100 is started, each node included in the cluster may have a cluster generation ID of '00'. If a node fails and subsequently rejoins the cluster, that node may update its cluster generation ID to '01' upon rejoining the cluster 100.

Inode cookies 74 may be updated throughout the cluster by associating each cookie 74 with a lock for that cookie's inode 70. A node 10 may update a local cookie 74 value in response to the lock on the inode 70 with which the cookie is associated changing state (e.g., to invalid, shared, or exclusive) at that node 10. For example, when a node 10 acquires a lock on an on-disk node 200 cached as in-core inode 70, the node may receive a communication from the global lock manager 40 (either locally or from another node 10 via interface 24) indicating that the lock has been acquired. If no cookie value is currently assigned to the inode 70 for which the lock is acquired, the node 10 may assign that inode 70 a cookie (e.g., by storing the assigned cookie value in inode table 34). If the node subsequently allocates a DNLC entry 60 to a file associated with that inode 70, the file system 30 may store the local cookie value in that DNLC entry 66. When the node 10 accesses that DNLC entry, the file system 30 will compare the cookie value stored in the DNLC entry with the local cookie value (e.g., in inode table 34). If the two values match, the file system 30 may use the inode pointer stored in the DNLC entry to access the requested file. Note that each node may use the inode identifier 73 contained in the local inode 70 to identify the on-disk inode 200 when communicating with the global lock manager 40.

If another node subsequently performs an action that would affect the validity of a DNLC entry, that node will first need to acquire the lock on that inode. When that other node acquires the lock, the first node's will receive a communication from the global lock manager 40 indicating that the first node's lock on the inode has been revoked. Upon receiving that communication, the first node may then modify the value of its local cookie 74 associated with the inode. When that node subsequently accesses the DNLC entry associated with that inode and compares the cookie value stored in the DNLC entry with the local cookie, the values will not be equal and the node 10 will ignore the DNLC entry.

Additionally, in some embodiments, a node may modify an inode's cookie value 74 when that the node acquires an exclusive lock on that inode 70. For example, if a node 10 requests an exclusive lock on an inode 70 to reallocate the inode to another file or to rename or remove the file with which that inode 70 is associated, that node 10 may update the value of the cookie 74 associated with the inode 70 in the local inode table 34.

In some embodiments, cookie values may be passed from node to node via the global lock manager 40. Locks may be granted and revoked by communicating messages from the global lock manager 40 to the file system 30. Cookie values may be included in or appended to these messages. For example, when a node's lock on an inode 70 is being revoked (e.g., from exclusive to shared or invalid), the node 10 may provide that cookie 74 associated with that inode 70 to the global lock manager 40. When the global lock manager 40 grants a lock (e.g., shared or exclusive) on that inode to another node, the grant message may include the cookie value. In response to receiving the grant message and cookie value, the node acquiring the lock may store the cookie value as the new value of its local cookie associated with the inode. The global lock manager 40 may continue to provide the cookie value to all nodes acquiring a lock (e.g., shared) on that inode until the cookie value is changed by a process holding an exclusive lock on that inode. Since the cookie value may be "piggybacked" with the lock grant messages, additional communications are not needed to update cookie values throughout the cluster. A DNLC entry may be revalidated when a node acquires a shared lock on the inode referenced in a matching DNLC entry when a DNLC lookup is performed. In some embodiments, a node 10 may acquire a lock on an inode 200 from the global lock manager 40 in order to compare the cookie 74 to the cookie 66 stored in the DNLC entry 60.

Note that in other embodiments, cookie values may be local (i.e., cookie values may be independently generated and maintained at each node 10 and nodes 10 may not share cookie values with each other). In these embodiments, each time a node's lock on an inode is revoked to invalid, that node 10 may assign a new value to a local inode cookie associated with that inode. Alternatively, the node may assign a new value to an inode cookie each time a lock is acquired on an inode on which the node formerly held an invalid lock. As a result, whenever a lookup for the file to which that inode is allocated is subsequently performed, the inode cookie value stored in the DNLC entry will not match the inode cookie in the inode table and the file system 30 may not use the information in that DNLC entry. Upon getting the correct inode information from the parent directory of the file, the file system 30 may allocate a new entry (or reuse the existing entry) in the DNLC to store the filename and the current inode cookie value from the local inode table.

FIG. 3 illustrates an exemplary series of activities that may occur when implementing a cookie-based DNLC, according to one embodiment. Several activities are listed, along with the effects of those activities at three nodes, N1–N3, within a cluster. Activity 1 represents the initial state of the nodes N1–N3 with respect to a file F1 before creation of that file. Since the file does not exist, none of the nodes N1–N3 maintain any metadata or DNLC entries for that filename.

In Activity 2, node N1 creates file F1. In order to create file F1, node N1 assigns an on-disk inode to filename F1 (the local pointer to the cached copy of that inode is IP11) by acquiring an exclusive lock on that on-disk inode from the global lock manager. When requesting the exclusive lock from the global lock manager, node N1 may use the inode identifier of the on-disk inode (obtained from the local in-core inode pointed to by IP11). As part of creating the file, the node N1 accesses a cookie generation routine to receive a cookie value C11 to store with the local inode pointed to by IP11. Node N1 may also allocate a DNLC entry to file F1. Within that DNLC entry, node N1 may store the inode pointer IP11 and a copy of the current cookie value (here, C11) associated with the inode pointed to by IP11.

In Activities 3 and 4, nodes N2 and N3 respectively lookup file F1 in their DNLCs. Since neither node has an entry in the DNLC that matches this filename, each node may access other metadata to find the file and find or initialize a local inode pointer (respectively, inode pointers IP21 and IP31) to an in-core copy of the inode for the file. While the inode pointers IP11, IP21, and IP31 vary from node to node, these inode pointers all reference the same on-disk inode and are accessed via the same global lock. To allocate a local DNLC entry corresponding to file F1, node N2 requests a shared lock on the on-disk inode identified in the in-core inode pointed to by local inode pointer IP21, which revokes N1's exclusive lock on that on-disk inode to shared. In response to node N1's exclusive lock being revoked to shared, N1's cookie value C11 for the inode is provided to the global lock manager. The global lock manager then provides this cookie value to node N2 when granting the shared lock on the inode to N2. Accordingly, node N2 stores this cookie value with the inode pointed to local inode pointer IP21. When node N2 allocates a DNLC entry to file F1, node N2 copies this cookie value C11 into the DNLC entry. Node N3 behaves similarly in Activity 3 to allocate an entry in node N3's DNLC to file F1.

Activity 5 shows N2 acquiring an exclusive lock on the on-disk inode identified in the in-core inode pointed to by local pointer IP21 to perform I/O to file F1. N2 may acquire the exclusive lock by providing to the global lock manager the unique inode identifier of the on-disk inode, which is in turn retrieved from the local inode pointed to by IP21. Node N2's acquisition of the exclusive lock revokes the shared locks held by N1 and N3. In response to their locks on the inode being revoked, nodes N1 and N3 update their cookie values associated with the inode to an invalid value (INV).

Next, in Activity 6, N3 looks up F1 in its DNLC. Since the cookie value C11 in N3's DNLC does not match the cookie value (INV) stored with the inode identified in that DNLC entry, N3 requests a shared lock on the inode. When the lock manager receives the request, N2's exclusive lock is revoked to shared and the cookie value C11 is provided to the lock manager. The lock manager then grants the shared lock to N3, passing cookie value C11 to N3 as part of the lock grant message. In response to receiving cookie value C11 and storing cookie value C11 in the inode pointed to by inode pointer IP31, node N3's DNLC entry is revalidated, since the two cookie values now match. Accordingly, N3 may now use the information in the DNLC entry to access file F1 without having to scan the file's parent directory on disk.

N3 removes file F1 in Activity 7. In order to remove F1, N3 requests an exclusive lock on the inode pointed to by inode pointer IP31. When this lock is acquired by node N3, node N2's shared lock is revoked and N2 responsively modifies the cookie value of the inode pointed to by inode pointer IP21 to INV. When N3 acquires the exclusive lock, N3 removes F1 and stores a new cookie value C31 for the inode pointed to by inode pointer IP31. By changing the cookie value, the file system guarantees that none of the existing DNLC entries for file F1 will be revalidated if nodes N1–N3 subsequently attempt to access file F1.

As part of Activity 8, node N1 looks up file F1 in its DNLC. Since the DNLC entry's cookie value C11 does not match the cookie value stored with the inode pointed to by inode pointer IP11, N1 acquires a shared lock on that inode. When the shared lock is acquired, N3's exclusive lock on that inode is revoked to shared and the cookie value C31 associated with that inode on N3 is provided to the lock manager. The lock manager provides this cookie value to node N1 with the grant of the shared lock. Since the received cookie value does not match the cookie value in the DNLC entry, the DNLC entry is not revalidated. Thus, node N1 may perform an access to a directory on disk in an attempt to locate file F1 and/or invalidate the entry allocated to F1 in the DNLC.

Node N3 reallocates the on-disk inode pointed to by local inode pointer IP31 to a new file F2 as part of Activity 9. In order to reallocate the on-disk inode, node N3 acquires an exclusive lock on the inode. This revokes the shared lock held by N1, causing N1 to set its cookie value associated with the inode to INV. When reallocating the inode, N3 assigns a new cookie value C32 to the inode. Node N3 then allocates a DNLC entry to file F2 and stores the current cookie value C32 associated with the inode in the DNLC entry. Note that in some embodiments, node N3 may use a different local inode pointer to refer to the cached copy of the reallocated on-disk inode.

In Activity 10, node N2 looks up file F2. Since N2 does not yet have a DNLC entry allocated to F2, N2 may locate the file by accessing other metadata. Node N2 may continue to use the inode pointer IP21 to identify the inode. When creating a DNLC entry for F2, node N2 acquires a shared lock on the inode. Acquisition of the shared lock revokes N3's exclusive lock to shared and the cookie value C32 associated with the inode on N3 is provided to the lock manager. The lock manager provides the cookie value C32 to node N2 in the lock grant message. Node N2 stores the cookie value with the inode pointed to by inode pointer IP21 and then stores that value in the DNLC entry for file F2.

Some embodiments may use cookies to perform negative DNLC caching. Negative DNLC caching allows the DNLC to indicate that a file is not present in the file system. Negative name caching may be implemented using another cookie in directory inodes. This cookie is referred to herein as a negative cookie, and may have different values than the cookies (which may be referred to as positive cookies) described above for use when performing traditional DNLC activities. When a file is removed or not found during a search, the file system may allocate a negative entry in the acting node's DNLC to that filename. When the negative entry is allocated, the file system may store a copy of the parent directory's inode's negative cookie in the negative entry. Subsequent lookups to the DNLC for that file on that node may return an indication (e.g., ENOENT) indicating that the file is no longer present in the file system without having to scan the on-disk directory or other metadata, assuming that the parent directory's inode's negative cookie has the same value as the copy of the negative cookie stored in that DNLC entry.

Note that several different negative DNLC entries may refer to different files in the same directory. So as long as the negative cookie of the directory inode is not changed, all the negative DNLC entries referring to the missing files in that directory are valid. However, when a new file is added to the directory, the file system on the node that is adding the new file will modify the negative cookie of the directory inode, causing the negative DNLC entries referencing that directory inode on all the nodes across the cluster to be invalidated. For example, the DNLC entries may be invalidated if the nodes having DNLC entries referencing that directory inode had to acquire a shared lock on the directory inode to create the negative DNLC entries. When the lock is revoked (e.g., when the node creating the new file in that directory acquires an exclusive lock on the directory inode to create the new file), these nodes may update their negative cookie for that directory to an invalid value, effectively invalidating the DNLC entries referencing that directory inode. If these nodes attempt to revalidate their DNLC entries by acquiring a shared lock on the directory inode, the negative cookie value (e.g., received as part of the lock grant message) associated with that directory inode will no longer equal the value stored in the DNLC entries.

Figure 4:
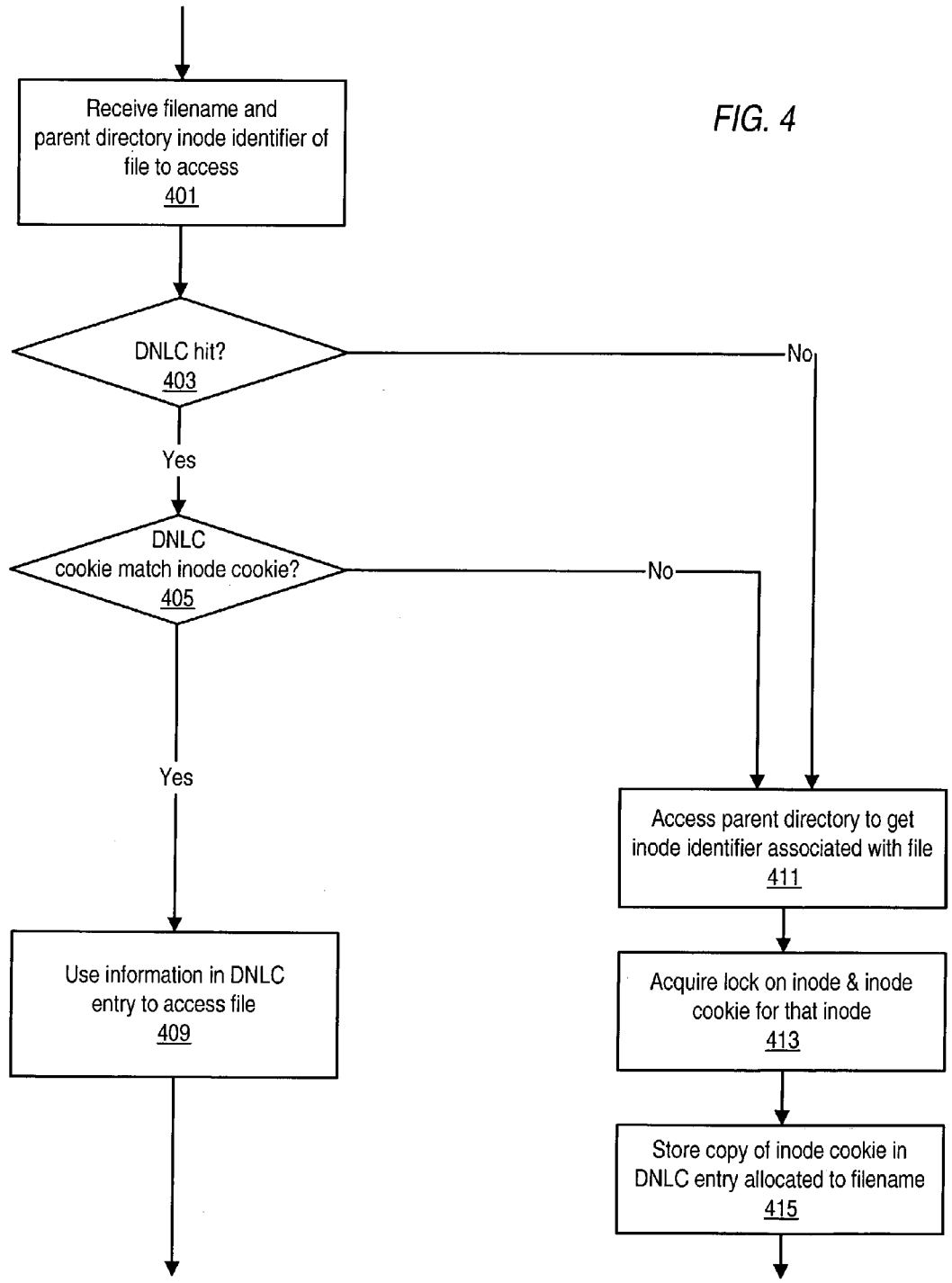
FIG. 4 is a flowchart of one embodiment of a method of implementing a cookie-based DNLC.

FIG. 4 illustrates one embodiment of a method of implementing a cookie-based DNLC in a cluster. At 401, a node's DNLC receives a filename and parent directory inode pointer (e.g., a pointer to an in-core copy of the on-disk inode associated with the parent directory) for a file that node is attempting to access. Whether there is a matching entry in that node's DNLC is determined at 403. In some embodiments, this determination may be performed by inputting a filename, a parent directory inode pointer, and a parent directory inode cookie value to the DNLC to determine if any entry matches all three values. If there is a matching entry, the node may then determine whether the DNLC entry is valid by comparing the cookie value stored in the DNLC to a cookie value associated with the inode referenced in the DNLC, as shown at 405. If the cookie values match, the node may use the information in the DNLC entry to access the file, as shown at 409.

In some embodiments, the node may acquire a lock (e.g., a shared lock) on the inode referenced in the matching entry before performing a comparison between the cookie value in the DNLC to the cookie value associated with the inode referenced in the DNLC. For example, upon detection of a matching DNLC entry at 403, the node may acquire a lock on the inode identified in that DNLC entry. In such embodiments, a message granting the lock may include the cookie value associated with that inode from a global lock manager. The node may update a local copy of the inode with the cookie value received in the message granting the lock. The node may then compare the cookie value associated with the inode to the cookie value in the DNLC entry, as shown at 405. If the node already holds an appropriate lock (e.g., shared or exclusive) on the inode when a matching entry is found in the DNLC, the node may simply compare the cookie value stored in the DNLC entry to the cookie value stored locally with the referenced inode. Note that a cookie associated with the parent directory's inode may also be compared to a corresponding cookie value stored in the DNLC entry, either as part of detecting a matching DNLC entry at 403 or at 405.

The node may recognize that the matching DNLC entry is invalid if the cookie values do not match, as determined at 405. If the DNLC entry is invalid, or if no matching DNLC entry was found at 403, the node may access the file's parent directory via other metadata to determine which inode is associated with that file, as shown at 411. The node may then acquire a lock on that inode and obtain a cookie value associated with that inode, as indicated at 413. If a cookie value is already associated with the inode, the node may obtain the existing cookie value in the message granting the lock on the inode. If no cookie value is currently associated with the inode, the node may access a cookie generation routine to obtain a cookie value for that inode. The node may then allocate a DNLC entry to the file and store a copy of the inode cookie in the DNLC entry, as shown at 415. In some embodiments, if there was a matching but invalid entry already in the DNLC (as determined at 403–405), the node may reuse the previously allocated DNLC entry instead of allocating a new DNLC entry.

Note that while the above description focuses on the storage of inode pointers in a metadata name cache such as DNLC 32, similar embodiments of a cookie-based metadata name cache may also be used to cache pointers to types of metadata (i.e., data describing user data) other than inodes. For example, pointers to vnodes may be cached in a cookie-based DNLC-type structure instead of inodes. In other embodiments, information such as NFS (Network File System) file handles and GLM (Global Lock Manager) lock names may alternatively (or additionally) be cached in a similar cookie-based DNLC 32 along with pointers to the metadata associated with the file handle or lock name.

Note that unlike traditional soft- and hard-hold DNLC implementations, which maintain a soft- or hard-hold on an inode for the lifetime of an entry, cookie-based DNLC entries may simply store pointers to modes. This may reduce the possibility of encountering situations in which a node runs out of free inodes due to holds by the DNLC.

Returning to FIG. 1, note that each node 10 may take various forms, including a workstation, server, mainframe computer system, network appliance, network computer, Internet appliance, personal digital assistant (PDA), embedded device, smart phone, television system, another suitable device, or combinations thereof.

Additionally, note that all or part of a file system application 30 may be stored on various computer accessible media. Examples of computer accessible media include hard disk storage, floppy disk storage, removable disk storage, flash memory, punch cards, magneto-optical storage, MEMs, magnetic core, and random access memory (RAM). Various embodiments may further include receiving, sending or storing instructions and/or data implemented in accordance with the foregoing description upon a computer accessible medium. A computer accessible medium may include a communication medium such as network and/or a wireless link on which communication signals such as electrical, electromagnetic, or digital signals are conveyed.

The flow charts described herein represent exemplary embodiments of methods. The methods may be implemented in software, hardware, or a combination thereof. The order of method may be changed, and various elements may be added, reordered, combined, omitted, modified, etc.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method, comprising:
    a node included in a cluster looking up a file in a metadata name cache;
    in response to a miss for the file in the metadata name cache, the node creating a metadata name cache entry for the file in the metadata name cache, wherein the metadata name cache entry comprises a copy of a cookie associated with metadata allocated to the file;
    in response to a lock on the metadata changing state for the node, the node modifying the cookie associated with the metadata, wherein the lock on the metadata changes state for the node in response to a request to a global lock manager for the lock on the metadata; and
    comparing the copy of the cookie stored in the metadata name cache entry to a current value of the cookie associated with the metadata to determine if the metadata name cache entry is valid.

2. The method of claim 1, wherein the metadata comprises an inode, and wherein the metadata name cache comprises a DNLC (Directory Name Lookup Cache).

3. The method of claim 1, further comprising the node modifying the cookie value associated with the metadata in response to reallocating the metadata to another file.

4. The method of claim 1, further comprising the node modifying the cookie value associated with the metadata in response to renaming or removing the file.

5. The method of claim 1, wherein said modifying comprises setting the current value of the cookie associated with the metadata to an invalid value.

6. The method of claim 5, further comprising the node reacquiring the lock on the metadata and receiving a new value of the cookie associated with the metadata in a message granting the lock to the node.

7. A node, comprising:
    a processor; and
    a memory coupled to the processor and storing program instructions executable by the processor to implement a file system, wherein the file system is configured to:
        allocate an entry in a metadata name cache to store a pointer to metadata associated with a file;
        store a copy of a cookie value associated with the metadata in the entry upon allocation of the entry;
        update the cookie value associated with the metadata in response to a lock on the metadata changing state for the node, wherein the lock changes state for the node in response to a request to a global lock manager for the lock on the metadata; and
        compare the copy of the cookie value stored in the entry with the cookie value associated with the metadata to determine if the entry is valid.

8. The node of claim 7, wherein the metadata comprises an inode, and wherein the metadata name cache comprises a DNLC (Directory Name Lookup Cache).

9. The node of claim 7, wherein the file system is configured to modify the cookie value associated with the metadata in response to reallocating the metadata to another file or in response to renaming or removing the file.

10. A method, comprising:
    a node of a plurality of nodes of a cluster looking up a file in a metadata name cache;
    in response to a miss for the file in the metadata name cache, the node creating a metadata name cache entry for the file in the metadata name cache, wherein the metadata name cache entry comprises a copy of a cookie associated with metadata allocated to the file;
    in response to an additional node included in the cluster reusing the metadata or renaming or removing the file, the additional node in the cluster modifying a value of the cookie associated with the metadata;
    a global lock manager providing the modified value of the cookie to the node in response to the node requesting a lock on the metadata; and
    the node comparing the copy of the cookie stored in the metadata name cache entry to the modified value of the cookie associated with the metadata in order to identify whether the metadata name cache entry is valid.

11. The method of claim 10, wherein the metadata comprises an inode, and wherein the metadata name cache comprises a DNLC (Directory Name Lookup Cache).

12. A clustered computer system, comprising:
    a plurality of nodes; and
    an interconnect coupling the plurality of nodes;
    wherein each of the plurality of nodes includes a DNLC (Directory Name Lookup Cache) comprising a plurality of entries, wherein each entry includes an pointer to an inode associated with a file with which that entry is associated and a copy of a cookie value associated with the inode; and
    wherein each of the plurality of nodes is configured to validate an entry in a respective DNLC by comparing the copy of the cookie value stored in the entry to the cookie value associated with the inode identified in the entry.

13. The clustered computer system of claim 12, wherein each of the plurality of nodes is configured to modify the cookie value associated with the inode in response to renaming or removing the file with which the inode is associated.

14. The clustered computer system of claim 12, wherein each of the plurality of nodes is configured to modify the cookie value associated with the inode in response to a lock held on that inode changing state for that node, wherein the lock changes state for that node in response to a global lock manager receiving a request for the lock on the inode.

15. The clustered computer system of claim 12, wherein each of the plurality of nodes is configured to receive a new cookie value associated with the inode in a message granting the lock on the inode to that node.

16. The clustered computer system of claim 12, wherein a file system operating on one of the plurality of nodes is configured to return the cookie value associated with the inode on the one of the plurality of nodes to a distributed lock manager in response to revocation of a lock held by the one of the plurality of nodes on the inode.

17. A tangible, computer readable storage medium storing program instructions, wherein the program instructions are computer executable to:
   look up a pointer to information about a file in a metadata name cache included within a node in a cluster;
   allocate an entry for the file in the metadata name cache in response to a miss for the file in the metadata name cache, wherein the entry comprises a copy of a cookie associated with metadata associated with the file and the pointer;
   modify the cookie associated with the metadata in response to a lock on the metadata changing state for the node, wherein the lock changes state for the node in response to a request to a global lock manager for the lock on the metadata; and
   compare the copy of the cookie stored in the entry to the cookie associated with the metadata to determine if the entry is valid.

18. The computer readable storage medium of claim 17, wherein the metadata comprises an inode, and wherein the metadata name cache comprises a DNLC (Directory Name Lookup Cache).

19. The computer readable storage medium of claim 17, wherein the program instructions are computer executable to modify the cookie value associated with the metadata in response to reallocating the metadata to another file or in response to renaming or removing the file.

20. The method of claim 1, wherein at least part of a value of the cookie associated with the metadata is generated by a cookie generation routine using a counter.

* * * * *